United States Patent
Kuze

(10) Patent No.: US 12,441,326 B2
(45) Date of Patent: Oct. 14, 2025

(54) DRIVE UNIT CONTROLLING TORQUE IN DRIVE SYSTEM MOUNTED ON VEHICLE

(71) Applicant: TOYOTA JIDOSHA KABUSHIKI KAISHA, Toyota (JP)

(72) Inventor: Shinjiroh Kuze, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/668,393

(22) Filed: May 20, 2024

(65) Prior Publication Data

US 2025/0065883 A1   Feb. 27, 2025

(30) Foreign Application Priority Data

Aug. 21, 2023 (JP) ................. 2023-134228

(51) Int. Cl.
*B60W 40/06* (2012.01)
*B60W 10/10* (2012.01)

(52) U.S. Cl.
CPC ............ *B60W 40/06* (2013.01); *B60W 10/10* (2013.01); *B60W 2552/20* (2020.02); *B60W 2710/1005* (2013.01)

(58) Field of Classification Search
CPC ...... B60W 10/08; B60W 10/10; B60W 40/06; B60W 2552/20; B60W 2710/1005; H02K 7/003

See application file for complete search history.

(56) References Cited

U.S. PATENT DOCUMENTS

| | | | |
|---|---|---|---|
| 7,836,986 B1 * | 11/2010 | Gillecriosd | B60W 10/08 180/170 |
| 2002/0029646 A1 | 3/2002 | Takenaka et al. | |
| 2013/0104830 A1 * | 5/2013 | Moriya | F02N 15/00 123/179.4 |
| 2015/0274187 A1 * | 10/2015 | Storch | A61G 5/1051 192/30 R |
| 2018/0257476 A1 * | 9/2018 | Yokouchi | F16D 3/76 |

FOREIGN PATENT DOCUMENTS

JP    2002-089664 A    3/2002

* cited by examiner

*Primary Examiner* — Edwin A Young
(74) *Attorney, Agent, or Firm* — SoraIP, Inc.

(57) ABSTRACT

A drive unit mounted on a vehicle includes: a motor; a motor-side shaft having a first spline on an outer peripheral surface thereof and rotated by torque from the motor; a gear-side shaft having a second spline on the outer peripheral surface thereof and disposed coaxially with the motor-side shaft; and a coupling sleeve disposed from the motor-side shaft to the gear-side shaft and having a third spline on the inner peripheral surface thereof that engages with the first spline and the second spline. The coupling sleeve is configured to be movable along the axial direction, and at least one of a first engagement length in which the third spline engages the first spline and a second engagement length in which the third spline engages the second spline varies according to an axial position of the coupling sleeve.

5 Claims, 4 Drawing Sheets

DRIVE UNIT CONTROLLING TORQUE IN DRIVE SYSTEM MOUNTED ON VEHICLE

CROSS-REFERENCE TO RELATED APPLICATION

This application claims priority to Japanese Patent Application No. 2023-134228 filed on Aug. 21, 2023, incorporated herein by reference in its entirety.

BACKGROUND

1. Technical Field

The technology disclosed herein relates to a drive unit mounted on a vehicle.

2. Description of Related Art

Japanese Unexamined Patent Application Publication No. 2002-89664 (JP 2002-89664 A) discloses a drive unit mounted on a vehicle. The drive unit includes a motor, a motor-side shaft, and a gear-side shaft disposed coaxially with the motor-side shaft.

SUMMARY

In a vehicle in which the drive unit is mounted, the torsional resonance frequency of the drive system of the vehicle occasionally substantially coincide with the unsprung resonance frequency of the vehicle. When the vehicle is traveling on a road surface having irregularities, the slip and the grip are repeatedly generated to cause periodic torque fluctuations. When the frequency of torque fluctuations coincides with the torsional resonance frequency and the unsprung resonance frequency, excessive torque may be generated in the drive system. It is desired to suppress generation of excessive torque in the drive system.

The present specification provides a technique capable of suppressing generation of excessive torque in a drive system.

A first aspect of the present technology provides a drive unit mounted on a vehicle, including:
- a motor;
- a motor-side shaft having first splines on an outer peripheral surface and rotated by torque from the motor;
- a gear-side shaft having second splines on an outer peripheral surface and disposed coaxially with the motor-side shaft; and
- a coupling sleeve disposed to extend from the motor-side shaft to the gear-side shaft and having third splines on an inner peripheral surface to engage with the first splines and the second splines.

The coupling sleeve is configured to be movable along an axial direction, and at least one of a first engagement length for which the third splines engage with the first splines and a second engagement length for which the third splines engage with the second splines is varied according to an axial position of the coupling sleeve.

In the above configuration, the motor-side shaft and the gear-side shaft are coupled by the coupling sleeve. When the coupling sleeve moves in the axial direction, at least one of the first engagement length and the second engagement length is varied. When at least one of the first engagement length and the second engagement length is varied, the torsional rigidity of the drive system is varied. The torsional resonance frequency of the drive system is varied as the torsional rigidity of the drive system is varied. Therefore, the torsional resonance frequency of the drive system can be varied by moving the coupling sleeve in the axial direction. It is possible to suppress the torsional resonance frequency and the unsprung resonance frequency coinciding with each other by varying the torsional frequency of the drive system. Thus, it is possible to suppress generation of excessive torque in the drive system.

In a second aspect, the drive unit according to the first aspect may further include an actuator that moves the coupling sleeve in the axial direction.

According to the above configuration, it is not necessary for a user to manually move the coupling sleeve. Thus, the convenience of the user can be improved.

In a third aspect, in the drive unit according to the second aspect, the actuator may move the coupling sleeve at least between a first position and a second position according to a degree of flatness of a road surface on which the vehicle is traveling.

The frequency of torque fluctuations caused in the vehicle is different according to the degree of flatness of the road surface on which the vehicle is traveling. According to the above configuration, the actuator moves the coupling sleeve according to the frequency of torque fluctuations. Therefore, the torsional resonance frequency of the drive system is varied according to the frequency of torque fluctuations. Thus, it is possible to suppress coincidence between the frequency of torque fluctuations and the torsional resonance frequency.

In a fourth aspect, in the drive unit according to the third aspect, the actuator may dispose the coupling sleeve at the second position when the road surface on which the vehicle is traveling is a wavy road that meets a predetermined condition, and the actuator may dispose the coupling sleeve at the first position when the road surface on which the vehicle is traveling is not the wavy road.

According to the above configuration, it is possible to suppress generation of excessive torque in the drive system even when the torsional resonance frequency of the drive system at the time when the coupling sleeve is positioned at the first position coincides with the unsprung resonance frequency and the frequency of torque fluctuations at the time when the vehicle is traveling on the wavy road.

In a fifth aspect, in the drive unit according to the third or fourth aspect, a total length of the first engagement length and the second engagement length may be shorter when the coupling sleeve is located at the second position than when the coupling sleeve is located at the first position.

The torsional rigidity of the drive system is higher as the total length of the first engagement length and the second engagement length is longer. The frequency at which the vehicle travels on a road surface different from the wavy road is higher than the frequency at which the vehicle travels on the wavy road. In general, the ride comfort of the vehicle is better as the torsional rigidity is higher. According to the above configuration, the torsional rigidity of the drive system at the time when the vehicle travels on a road surface different from the wavy road is higher than the torsional rigidity at the time when the vehicle travels on the wavy road. Thus, it is possible to secure the ride comfort of the vehicle and to suppress generation of excessive torque in the drive system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
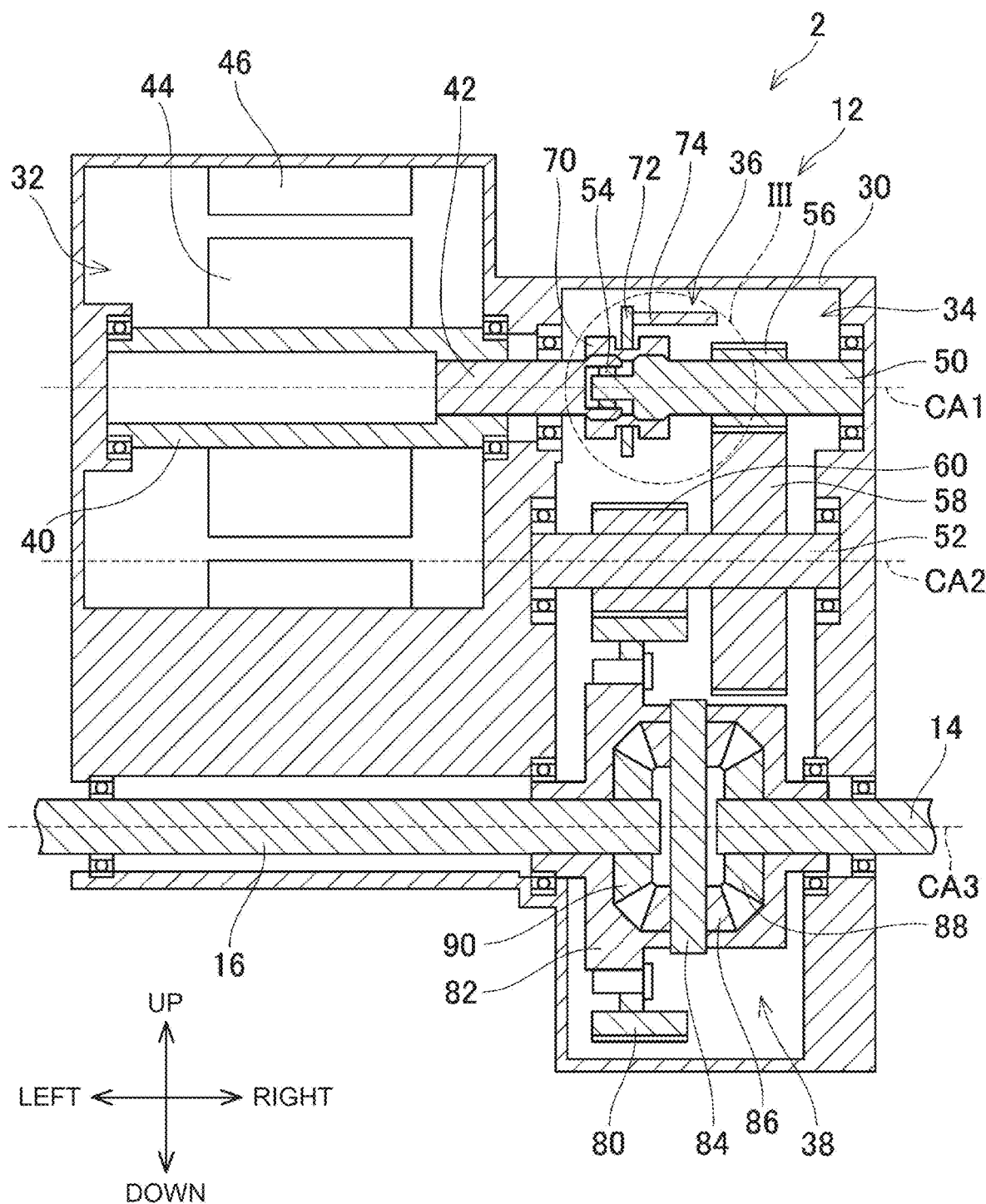
FIG. 1 is a schematic view of a vehicle 2.
Figure 3:
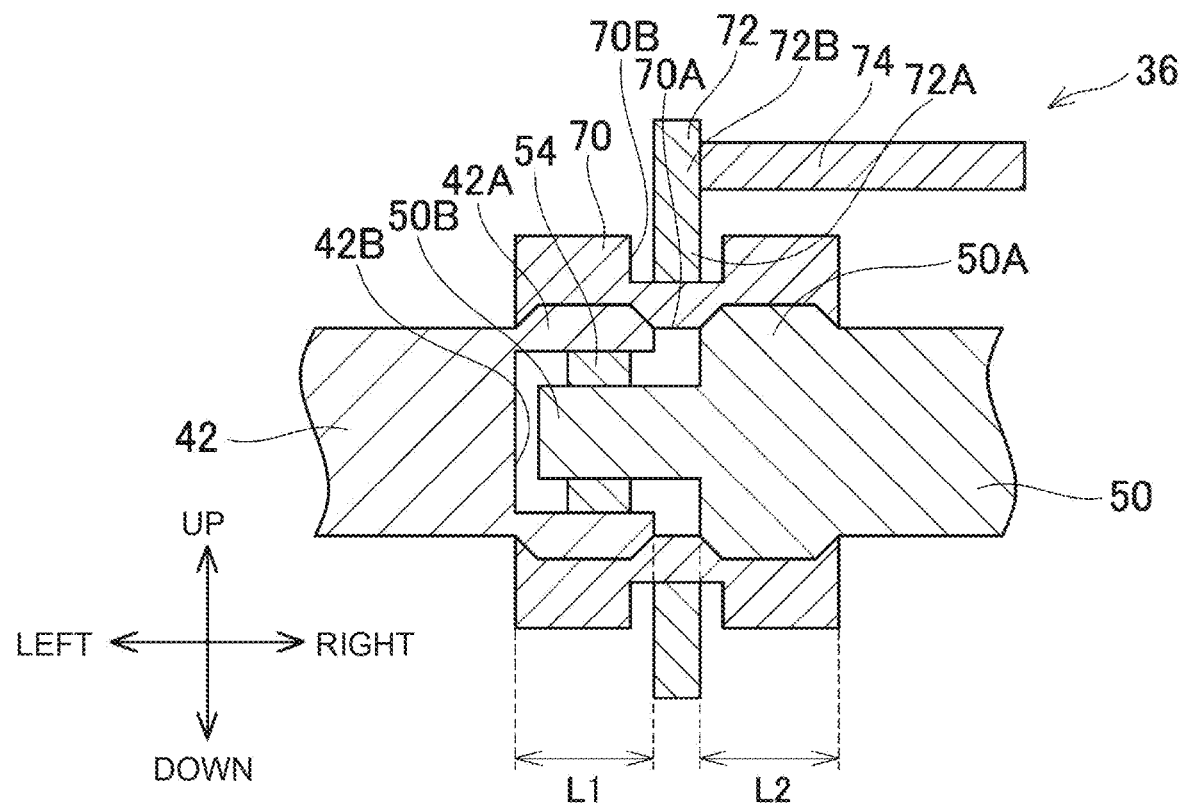
FIG. 3 is an enlarged view of III of FIG. 1.
Figure 4:
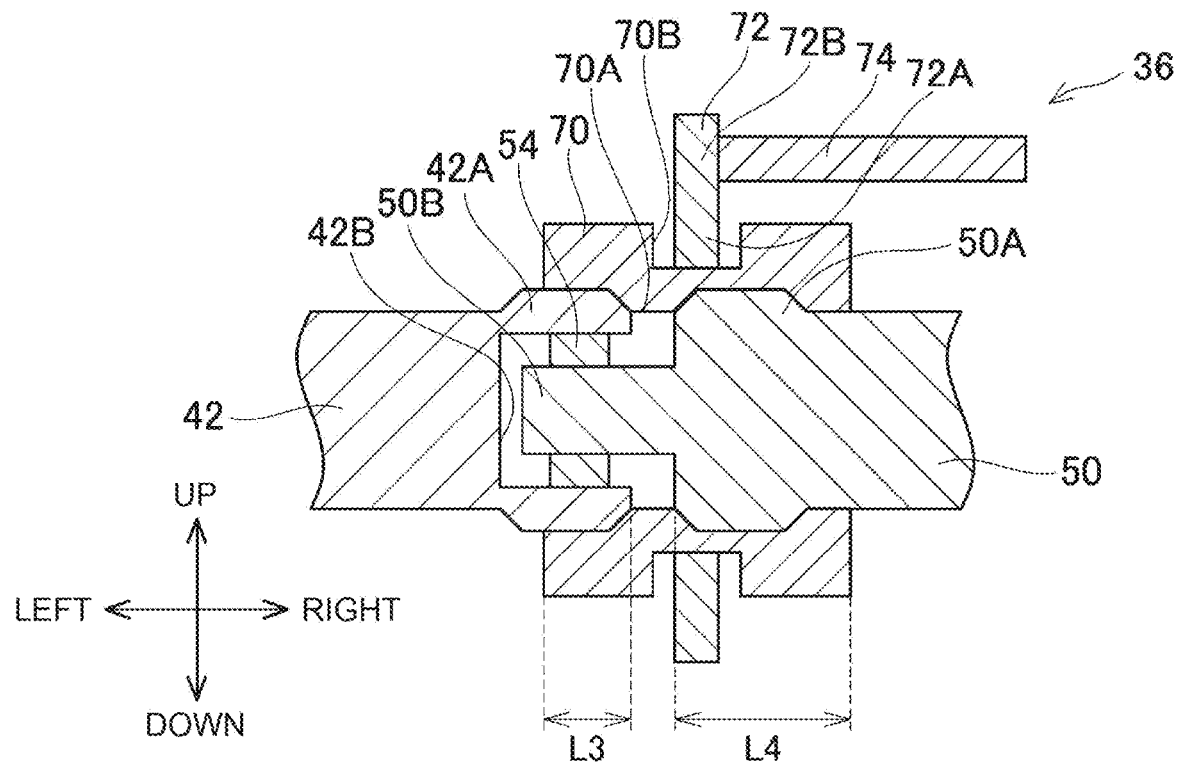
FIG. 4 shows the coupling sleeve 70 of the coupling unit 36 in the second position.

The vehicle 2 of the present embodiment will be described with reference to FIGS. 1 to 6. FIG. 1, FIG. 3, and FIG. 4 are schematic cross-sectional views of a vehicle 2 for clarity of explanation. Hereinafter, for ease of understanding, the up-down direction and the left-right direction of FIG. 1 will be described as "up-down direction" and "left-right direction", respectively, but the actual direction is not defined.

Figure 2:
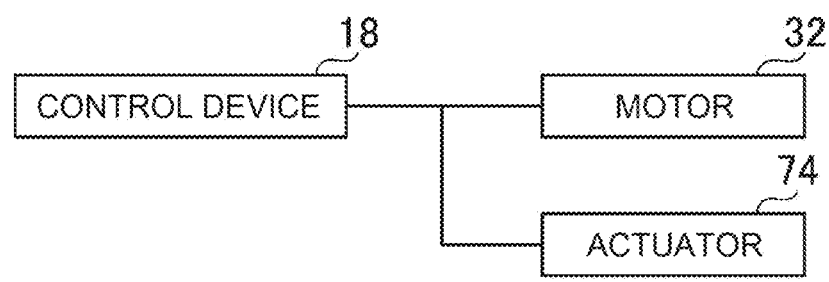
FIG. 2 is a diagram illustrating a control configuration of the vehicle 2.

As illustrated in FIG. 1, the vehicle 2 includes a drive unit 12, a right drive shaft 14, a left drive shaft 16, and a control device 18 (see FIG. 2). The vehicles 2 are, for example, battery-powered electrified vehicle, hybrid electrified vehicle, plug-in hybrid electrified vehicle, and fuel cell electrified vehicle.

Configuration of Drive Unit 12

The drive unit 12 includes a housing 30, a motor 32, a gear unit 34, a coupling unit 36, and a differential mechanism 38. The motor 32, the gear unit 34, the coupling unit 36, and the differential mechanism 38 are housed in the housing 30.

Configuration of Motor 32

The motor 32 includes an output shaft 40, a motor-side shaft 42, a rotor 44, and a stator 46. The output shaft 40 and the motor-side shaft 42 extend along a central axis CA1 extending in the left-right direction. The output shaft 40 is rotatably supported by the housing 30. The left end portion of the motor-side shaft 42 is attached to the output shaft 40. As shown in FIG. 3, a first spline 42A is formed on the outer peripheral surface of the right end portion of the motor-side shaft 42. A recessed portion 42B recessed to the left side is formed at a right end portion of the motor-side shaft 42. As shown in FIG. 1, the rotor 44 is fixed to the output shaft 40. The stator 46 is fixed to an inner wall of the housing 30.

Configuration of Gear Unit 34

The gear unit 34 includes a gear-side shaft 50 and an intermediate shaft 52. The gear-side shaft 50 extends along a central axis CA1 extending in the left-right direction. That is, the gear-side shaft 50 is disposed coaxially with the output shaft 40 and the motor-side shaft 42. A right end portion of the gear-side shaft 50 is rotatably supported by the housing 30. Although not shown, the vicinity of the left end portion of the gear-side shaft 50 is also rotatably supported by the housing 30. As shown in FIG. 3, a second spline 50A is formed at the left end of the gear-side shaft 50. A protruding portion 50B protruding leftward is formed at a left end portion of the gear-side shaft 50. The protruding portion 50B has a cylindrical shape. The outer diameter of the protruding portion 50B is smaller than the inner diameter of the recessed portion 42B of the motor-side shaft 42. Bearings 54 are provided between the outer peripheral surface of the protruding portion 50B and the inner peripheral surface of the recessed portion 42B. As shown in FIG. 1, the gear-side shaft 50 rotatably 15 supports the first intermediate gear 56.

The intermediate shaft 52 extends along a central axis CA2 extending in the left-right direction. The central axis CA2 is located below the central axis CA1. The left and right end portions of the intermediate shaft 52 are rotatably supported by the housing 30. The intermediate shaft 52 rotatably supports the second intermediate gear 58 and the third intermediate gear 60. The second intermediate gear 58 meshes with the first intermediate gear 56 of the gear-side shaft 50. The outer diameter of the second intermediate gear 58 is larger than the outer diameter of the first intermediate gear 56. The outer diameter of the third intermediate gear 60 is smaller than the outer diameter of the second intermediate gear 58.

Configuration of Coupling Unit 36

As shown in FIG. 3, the coupling unit 36 includes a coupling sleeve 70, a fork 72, and an actuator 74. The coupling sleeve 70 is disposed from a right end portion of the motor-side shaft 42 to a left end portion of the gear-side shaft 50. A third spline 70A that engages with the first spline 42A of the motor-side shaft 42 and the second spline 50A of the gear-side shaft 50 is formed on the inner peripheral surface of the coupling sleeve 70. A recessed portion 70B that is recessed radially inward is formed on an outer peripheral surface of the coupling sleeves 70. The fork 72 has a semicircular arc shape when the fork 72 is viewed from the left-right direction. The radially inner end 72A of the fork 72 fits into the recessed portion 70B of the coupling sleeve 70. An actuator 74 is connected to a radially outer end portion of the fork 72. The actuator 74 moves the coupling sleeve 70 along the left-right direction via the fork 72. That is, the actuator 74 moves the coupling sleeve 70 along the axial direction of the motor-side shaft 42 and the gear-side shaft 50. The coupling sleeve 70 is movable between a first position (see FIG. 3) and a second position (see FIG. 4). In the first position, the first engagement length in which the third spline 70A engages the first spline 42A is a length L1, and the second engagement length in which the third spline 70A engages the second spline 50A is a length L2. In the second position of FIG. 4, the first engagement length is the length L3 and the second engagement length is the length L4. The length L1 is longer than the length L3. The length L2 and the length LA are the same. That is, the total length of the first engagement length and the second engagement length is shorter when the coupling sleeve 70 is in the second position (see FIG. 4) than when the coupling sleeve 70 is in the first position (see FIG. 3).

Configuration of Differential Mechanism 38

As illustrated in FIG. 1, the differential mechanism 38 includes a ring gear 80, a differential case 82, a pinion shaft 84, a pinion gear 86, a right drive gear 88, and a left drive gear 90. The ring gear 80 meshes with the third intermediate gear 60 of the intermediate shaft 52. The differential case 82 is screwed to the ring gear 80. The differential case 82 rotates integrally with the ring gear 80. The differential case 82 is rotatably supported by the housing 30. The pinion shaft 84 is rotatably supported by the differential case 82. The pinion gear 86 is fixed to the pinion shaft 84. The right drive gear 88 meshes with the pinion gear 86. A right drive shaft 14 is connected to the right drive gear 88. The left drive gear 90 meshes with the pinion gear 86. A left drive shaft 16 is connected to the left drive gear 90. The right drive shaft 14 and the left drive shaft 16 extend along a central axis CA3 extending in the left-right direction. The central axis CA3 is located below the central axis CA2.

The motor-side shaft 42, the gear unit 34, the differential mechanism 38, the right-side drive shaft 14, and the left-side drive shaft 16 function as a so-called "drive system" that transmits the driving force of the motor 32 to the wheels.

Configuration of Control Device 18

The control device 18 of FIG. 2 includes a CPU, ROM, RAM or the like. The control device 18 is an Electronic Control Unit (ECU) mounted on the vehicle 2. The control device 18 controls operations of the motor 32, the actuator 74, and the like.

The control device 18 is configured to be able to detect whether or not the road surface on which the vehicle 2 is traveling is a corrugated road satisfying a predetermined condition (hereinafter, referred to as a "specific corrugated road"). Hereinafter, the road surface on which the vehicle 2 is traveling is referred to as "traveling road surface". As an example, the control device 18 detects whether or not the traveling road surface is a specific wave-like road based on whether or not the amount of change in the wheel speed of the wheels connected to the right drive shaft 14 and the left drive shaft 16 is equal to or greater than the first predetermined value. As an example, the predetermined condition is satisfied when the absolute difference between the frequency of the torque fluctuation generated when the vehicle travels on the wavy road and the unsprung resonance frequency of the vehicle 2, which will be described later, is within the second predetermined value. The control device 18 moves the coupling sleeve 70 to the first position (see FIG. 3) when the traveling road surface is not a specific wave-like road. On the other hand, the control device 18 moves the coupling sleeve 70 to the second position (see FIG. 4) when the traveling road surface is a specific wave-like road. The wavy road is a road in which the unevenness of the road surface is repeated.

Figure 5:
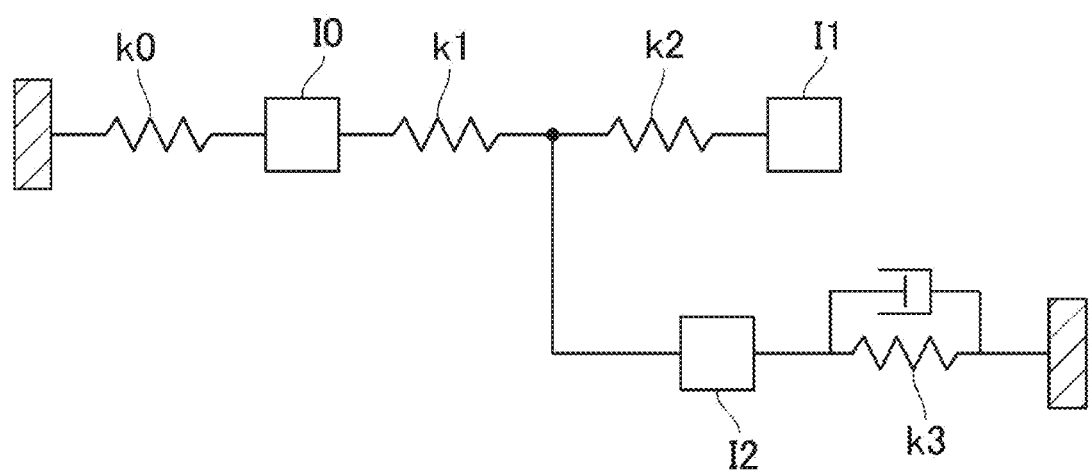
FIG. 5 is a schematic diagram showing a drive system model.
Figure 6:
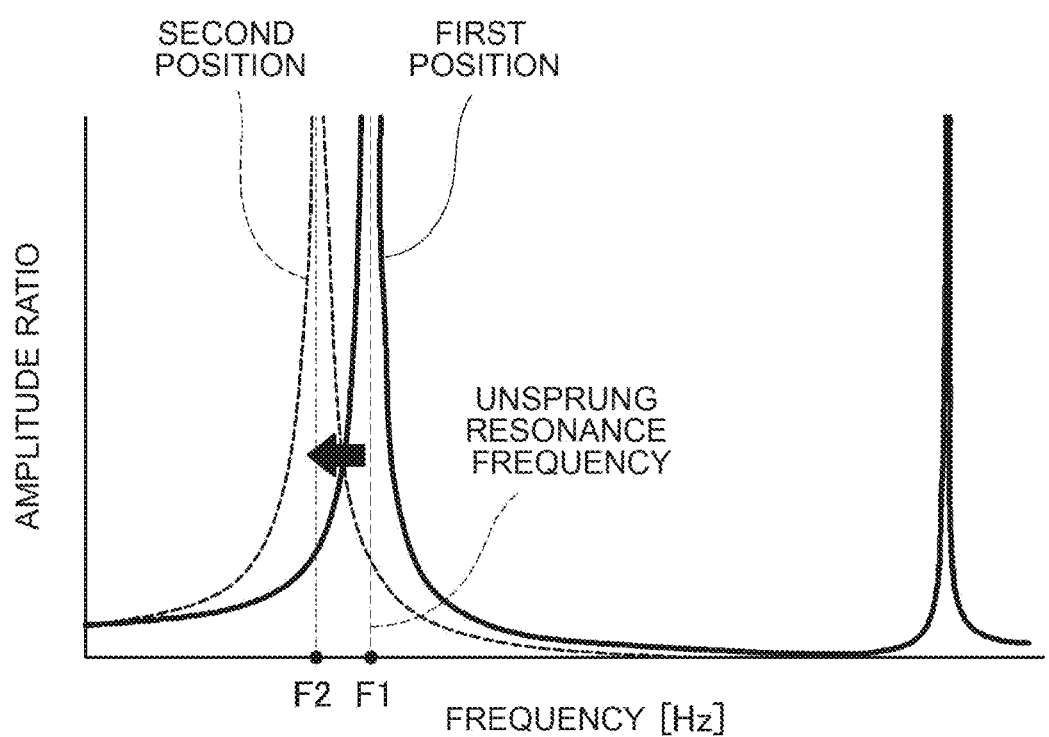
FIG. 6 is a frequency graph.

Referring to FIGS. 5 and 6, the reason why the coupling sleeve 70 is moved to the second position when the traveling road surface is a specific wave-like road will be described. In FIG. 6, the vertical axis represents the amplitude-ratio, and the horizontal axis represents the frequency [Hz].

The drive system model of the vehicle 2 is a model as shown in FIG. 5. The spring constants k0, k1, k2, k3 in FIG. 5 are the spring constants of the wheels, the drive shaft, the part connected by the coupling unit 36, and the mounts (not shown). The moment of inertia 10, 11, 12 is a torsional moment of inertia of the wheel, the rotor 44 of the motor 32, and the drive unit 12, respectively. The torsional resonance frequency of the drive train is determined by the moment of inertia of the torsion and the torsional stiffness. The torsional stiffness is equivalent to the spring constant. Therefore, the torsional resonance frequency of the drive system can be changed by changing the spring constant. Since the spring constant k0, k1, k2 is the spring constant of the springs connected in series, these composite spring constants are "(k0*k1*k2)/(k0+k1+k2)". The torsional stiffness (i.e., the spring rate k2) varies between the case where the coupling unit 36 is disposed at the first position (see FIG. 3) and the case where it is disposed at the second position (see FIG. 4). As a result, the spring constant of the drive train changes, and as a result, the torsional resonance frequency of the drive train changes.

As shown in FIG. 6, the first torsional resonance frequency F1 of the drive train when the coupling unit 36 is arranged in the first position substantially coincides with the unsprung resonance frequency of the vehicle 2. When the traveling road surface is a specific wave-like road, the slip and the grip are repeatedly generated, so that a periodic torque fluctuation occurs. Then, the frequency of the torque variation coincides with the unsprung resonance frequency and the first torsional resonance frequency F1. In this case, excessive torque is generated in the drive system. Meanwhile, a means for limiting the output torque of the motor 32 is conceivable in order to suppress generation of an excessive torque in the drive system. However, when the output torque of the motor 32 is limited, the acceleration performance of the vehicle 2 deteriorates. Therefore, when the control device 18 detects that the traveling road surface is a specific wave-like road, it moves the coupling sleeve 70 from the first position to the second position. Moving the coupling sleeves 70 to the second position changes the spring rate k2 of FIG. 5 such that the torsional resonant frequency of the drive train changes from the first torsional resonance frequency F1 to the second torsional resonance frequency F2. As a result, the torsional resonance frequency of the drive system does not coincide with the frequency of the torque fluctuation and the unsprung resonance frequency. Therefore, even if the output torque of the motor 32 is not limited, excessive torque is not generated in the drive system. For this reason, the coupling sleeve 70 is moved to the second position when the traveling road surface is a specific wave-like road.

Effect of this Example

As described above, the drive unit 12 mounted on the vehicle 2 may include a motor 32, a motor-side shaft 42 having a first spline 42A on an outer peripheral surface thereof and rotated by torque from the motor 32, a gear-side shaft 50 having a second spline 50A on an outer peripheral surface thereof and disposed coaxially with the motor-side shaft 42, and a coupling sleeve 70 disposed from the motor-side shaft 42 to the gear-side shaft 50 and having a first spline 42A and a third spline 70A engaged with the second spline 50A on an inner peripheral surface thereof. The coupling sleeve 70 is configured to be movable along the axial direction, and at least one of a first engagement length in which the third spline 70A engages with the first spline 42A and a second engagement length in which the third spline 70A engages with the second spline 50A may change according to an axial position of the coupling sleeve 70.

According to the above configuration, the motor-side shaft 42 and the gear-side shaft 50 are connected by the coupling sleeve 70. When the coupling sleeve 70 moves in the axial direction, at least one of the first engagement length and the second engagement length changes. By changing at least one of the first engagement length and the second engagement length, the torsional rigidity of the drive train is changed. As the torsional stiffness of the drive train changes, the torsional resonance frequency of the drive train changes. Therefore, by moving the coupling sleeve 70 in the axial direction, the torsional resonance frequency of the drive system can be changed. By changing the torsional frequency of the drive train, it is possible to prevent the torsional resonance frequency and the unsprung resonance frequency from coinciding with each other. Therefore, it is possible to suppress generation of excessive torque in the drive system.

The vehicle 2 further includes an actuator 74 that moves the coupling sleeve 70 in the axial direction.

According to the above configuration, the user may not manually move the coupling sleeve 70. Therefore, the convenience of the user can be improved.

In addition, the actuator 74 moves the coupling sleeve 70 between at least the first position and the second position in accordance with the flatness of the road surface on which the vehicle 2 is traveling.

The frequency of the torque fluctuation generated in the vehicle 2 varies depending on the flatness of the road surface on which the vehicle 2 is traveling. According to the above configuration, the actuator 74 moves the coupling sleeve 70 in accordance with the frequency of the torque fluctuation. Therefore, the torsional resonance frequency of the drive system changes in accordance with the frequency of the torque fluctuation. Therefore, it is possible to suppress coincidence between the frequency of the torque fluctuation and the torsional resonance frequency.

In addition, when the road surface on which the vehicle 2 is traveling is a corrugated road satisfying a predetermined condition, the actuator 74 arranges the coupling sleeve 70 in the second position, and when the road surface on which the vehicle 2 is traveling is not a corrugated road, the actuator 74 arranges the coupling sleeve 70 in the first position.

According to the above-described configuration, even when the torsional resonance frequency of the drive system when the coupling sleeve 70 is positioned at the first position coincides with the unsprung resonance frequency and the frequency of the torque fluctuation when the vehicle 2 is traveling on the wavy road, it is possible to suppress generation of excessive torque in the drive system.

In addition, the total length of the first engagement length and the second engagement length is shorter when the coupling sleeve 70 is in the second position than when the coupling sleeve 70 is in the first position.

When the total length of the first engagement length and the second engagement length is longer, the torsional rigidity of the drive system is higher. The frequency at which the vehicle 2 travels on a road surface different from the wavy road is higher than the frequency at which the vehicle 2 travels on the wavy road. Generally, the higher the torsional rigidity, the better the ride comfort of the vehicle 2. According to the above configuration, the torsional rigidity of the drive system when the vehicle 2 travels on a road surface different from the corrugated road is higher than the torsional rigidity when the vehicle 2 travels on the corrugated road. Therefore, it is possible to secure riding comfort of the vehicle 2 and to suppress generation of excessive torque in the drive system.

Although the specific examples disclosed by the present disclosure have been described in detail above, these are merely examples and do not limit the scope of claims. The techniques described in the claims include various modifications and alternations of the specific examples illustrated above.

First Modification

The drive unit 12 may comprise a mechanism for manually switching the position of the coupling sleeve 70. In the present modification, the drive unit 12 may not include the actuator 74.

Second Modification

The actuator 74 may move the coupling sleeve 70 in accordance with conditions other than the flatness of the traveling road surface.

Third Modification

The actuator 74 may continuously move the coupling sleeve 70 according to the flatness of the traveling road surface.

Fourth Modification

The total length of the first engagement length and the second engagement length may be longer when the coupling sleeve 70 is in the second position than when the coupling sleeve 70 is in the first position. That is, the torsional stiffness when the coupling sleeve 70 is in the second position may be greater than the torsional stiffness when the coupling sleeve 70 is in the first position.

In addition, the technical elements described in this specification or in the drawings may be used alone or in various combinations, and are not limited to the combinations described in the claims at the time of filing. In addition, the techniques illustrated in the present specification or drawings can achieve a plurality of objectives at the same time, and achieving one of the objectives itself has technical usefulness.

What is claimed is:

1. A drive unit mounted on a vehicle, comprising:
   a motor;
   a motor-side shaft having first splines on an outer peripheral surface and rotated by torque from the motor;
   a gear-side shaft having second splines on an outer peripheral surface and disposed coaxially with the motor-side shaft; and
   a coupling sleeve disposed to extend from the motor-side shaft to the gear-side shaft and having third splines on an inner peripheral surface to engage with the first splines and the second splines, wherein the coupling sleeve is configured to be movable along an axial direction, and at least one of a first engagement length for which the third splines engage with the first splines and a second engagement length for which the third splines engage with the second splines is varied according to an axial position of the coupling sleeve.

2. The drive unit according to claim 1, further comprising an actuator that moves the coupling sleeve in the axial direction.

3. The drive unit according to claim 2, wherein the actuator moves the coupling sleeve at least between a first position and a second position according to a degree of flatness of a road surface on which the vehicle is traveling.

4. The drive unit according to claim 3, wherein:
   the actuator disposes the coupling sleeve at the second position when the road surface on which the vehicle is traveling is a wavy road that meets a predetermined condition; and
   the actuator disposes the coupling sleeve at the first position when the road surface on which the vehicle is traveling is not the wavy road.

5. The drive unit according to claim 4, wherein a total length of the first engagement length and the second engagement length is shorter when the coupling sleeve is located at the second position than when the coupling sleeve is located at the first position.

* * * * *